US012294847B2

(12) United States Patent
Shen et al.

(10) Patent No.: US 12,294,847 B2
(45) Date of Patent: May 6, 2025

(54) TWEETER AND AUTOMOBILE AUDIO SYSTEM

(71) Applicant: SUZHOU SONAVOX ELECTRONICS CO., LTD., Suzhou (CN)

(72) Inventors: Yuewu Shen, Suzhou (CN); Guoqiang Chai, Suzhou (CN); Yuping Xie, Suzhou (CN); Peng Gao, Suzhou (CN); Bo Gu, Suzhou (CN)

(73) Assignee: SUZHOU SONAVOX ELECT/RONICS CO., LTD., Suzhou (CN)

( * ) Notice: Subject to any disclaimer, the term of this patent is extended or adjusted under 35 U.S.C. 154(b) by 231 days.

(21) Appl. No.: 17/997,062

(22) PCT Filed: Apr. 25, 2021

(86) PCT No.: PCT/CN2021/089622
§ 371 (c)(1),
(2) Date: Oct. 25, 2022

(87) PCT Pub. No.: WO2021/218856
PCT Pub. Date: Nov. 4, 2021

(65) Prior Publication Data

US 2023/0179924 A1 Jun. 8, 2023

(30) Foreign Application Priority Data

Apr. 26, 2020 (CN) ......................... 202010338269.6

(51) Int. Cl.
*H04R 9/06* (2006.01)
*H04R 1/28* (2006.01)
(Continued)

(52) U.S. Cl.
CPC ............. *H04R 9/06* (2013.01); *H04R 1/2849* (2013.01); *H04R 9/025* (2013.01); *H04R 9/045* (2013.01); *H04R 2499/13* (2013.01)

(58) Field of Classification Search
CPC ........ H04R 9/06; H04R 1/2849; H04R 9/025; H04R 9/045; H04R 2499/13
(Continued)

(56) References Cited

U.S. PATENT DOCUMENTS 4,720,867 A * 1/1988 Imai .................... B60R 11/0217 381/189
2005/0286729 A1* 12/2005 Harwood ................. H04R 7/04 381/152
(Continued)

FOREIGN PATENT DOCUMENTS

CN 106331962 * 1/2017
CN 106331962 A 1/2017
(Continued)

OTHER PUBLICATIONS

International Search Report and Written Opinion issued in PCT/CN2021/089622; mailed Jul. 16, 2021, 18 pgs.

*Primary Examiner* — Norman Yu
(74) *Attorney, Agent, or Firm* — HAUPTMAN HAM, LLP

(57) ABSTRACT

Disclosed are a tweeter and an automobile audio system. The tweeter comprises: a bracket; a diaphragm comprising a top portion and an edge ring; a magnetic motor system; and a voice coil. A first cavity is formed between the top portion of the diaphragm, an inner wall of the voice coil, and the magnetic motor system. The bracket has an annular inner flange and an annular outer flange, the edge ring of the diaphragm is connected to the outer flange of the bracket, and the magnetic motor system is connected to the inner flange of the bracket, so that a second cavity is formed
(Continued)

between the edge ring of the diaphragm, an outer wall of the voice coil, and the bracket. A through hole is opened on the voice coil, and the first cavity is in communication with the second cavity by the through hole.

13 Claims, 2 Drawing Sheets

(51) Int. Cl.
*H04R 9/02* (2006.01)
*H04R 9/04* (2006.01)

(58) Field of Classification Search
USPC .................. 381/86, 302, 389, 386, 398, 412
See application file for complete search history.

(56) References Cited

U.S. PATENT DOCUMENTS

| | | | | |
|---|---|---|---|---|
| 2012/0207321 | A1* | 8/2012 | Oshima | H04R 9/045 381/186 |
| 2018/0184198 | A1* | 6/2018 | Cross | H04R 9/025 |

FOREIGN PATENT DOCUMENTS

| | | | |
|---|---|---|---|
| CN | 108347679 | A | 7/2018 |
| CN | 208158876 | U | 11/2018 |
| CN | 210899588 | U | 6/2020 |
| CN | 111629306 | A | 9/2020 |

* cited by examiner

TWEETER AND AUTOMOBILE AUDIO SYSTEM

RELATED APPLICATIONS

This application is a U.S. National Phase of International Application Number PCT/CN2021/089622, filed Apr. 25, 2021, and claims priority from Chinese Patent Application No. CN 202010338269.6, filed Apr. 26, 2020, which is incorporated herein by reference in its entirety.

TECHNICAL FIELD

The present disclosure relates the field of loudspeakers, in particular to a tweeter and an automobile audio system.

BACKGROUND

The traditional tweeter usually includes a bracket, a diaphragm disposed on the bracket, a voice coil connected to the diaphragm, and a magnetic motor system fixedly connected to the bracket. The magnetic motor system includes a front plate, a magnetic steel and a U-yoke that are stacked in sequence, and an air-gap cavity is formed between the front plate, the voice coil and the diaphragm. The air-gap cavity of the existing tweeter is small, the starting frequency is narrow, and the distortion is large.

To solve this problem, the applicant presented a tweeter in Chinese patent CN208158876U, wherein a first cavity is formed between the magnetic motor system, the voice coil and the diaphragm, and a rear cover is provided, with the magnetic motor system arranged between the diaphragm and the rear cover, so that a second cavity is formed between the rear cover and the magnetic motor system, and through holes are opened on the magnetic motor system, and the through holes connect the first cavity and the second cavity to form the air-gap cavity of the tweeter. The tweeter with this structure effectively widens the starting frequency of the tweeter. However, due to the addition of the rear cover, the overall size (especially the thickness) of the loudspeaker is relatively large, which cannot be applied in some applications; it also complicates the assembly, and increases material costs.

SUMMARY

In view of the above problems, the present disclosure provides a tweeter, which ensures that the size of the tweeter is small and convenient assembly whilst widening the starting frequency of the tweeter The present disclosure further provides an automobile audio system, which does not need to be equipped with a mid-range loudspeaker, and has better sound effects at the same time.

According to a first aspect of the present disclosure, a tweeter, comprises:

- a bracket;
- a diaphragm arranged on the bracket, and comprising a top portion and an edge ring around the top portion;
- a magnetic motor system arranged on the bracket and having a magnetic gap; and
- a voice coil having an upper end connected to the top portion of the diaphragm or an edge portion of the edge ring close to the top portion, and a lower end portion inserted into the magnetic gap;

- wherein, a first cavity is formed between the top portion of the diaphragm, an inner wall of the voice coil, and the magnetic motor system;
- the bracket is hollow to accommodate the magnetic motor system, the bracket has an annular inner flange and an annular outer flange, the inner flange is lower than the outer flange, the edge ring of the diaphragm is connected to the outer flange of the bracket, and the magnetic motor system is connected to the inner flange of the bracket, so that a second cavity is formed between the edge ring of the diaphragm, an outer wall of the voice coil, and the bracket;
- a through hole is opened on the voice coil, and the first cavity is in communication with the second cavity by the through hole.

In one embodiment, the bracket has a groove formed between the outer flange and the inner flange, and the groove is a part of the second cavity. The air-gap cavity is effectively enlarged by the groove, which helps the starting frequency to expand forward.

Further, a damping material is arranged in the groove. The Q (Quality Factor) value of the tweeter is lowered to smooth the mid-frequency curve of the tweeter, reduce the distortion of the tweeter, and improve the sound quality.

Preferably, the damping material is polyurethane foam or foamed rubber or felt.

Further, the groove is an annular groove surrounding the magnetic motor system.

In one embodiment, a bottom surface of the bracket is higher than or in a same level with a bottom surface of the magnetic motor system.

In one embodiment, the upper end of the voice coil is connected to the edge portion of the top portion of the diaphragm close to the edge ring.

In one embodiment, the magnetic motor system comprises a front plate, a magnetic steel, and a U-yoke which are arranged in sequence, the U-yoke comprises a main body and an upper flange extending upward from the main body, and the upper flange is fixedly connected to the inner flange of the bracket, the front plate and the magnetic steel are arranged on the main body of the U-yoke, and the upper flange of the U-yoke surrounds the front plate and the magnetic steel to form the magnetic gap.

In one embodiment, the magnetic motor system comprises a front plate, a magnetic steel, and a T-yoke, the T-yoke comprises a main body and a columnar portion extending upward from the main body, the magnetic steel and the front plate are stacked on the main body from bottom to top, the magnetic steel and the front plate are sleeved on the columnar portion, the magnetic gap is formed between an outer surface of the columnar portion and inner surfaces of the front plate and the magnetic steel, and the main body is fixedly connected to the bracket.

In one embodiment, a plurality of through holes are arranged at intervals along a circumferential direction of the voice coil.

In one embodiment, the tweeter further comprises a panel covering above the diaphragm, and the panel, the edge ring and the outer flange of the bracket are sequentially and fixedly connected. When used in automobile audio systems, the tweeter is mounted on the interior of the automobile through its panel.

In one embodiment, the tweeter is a vehicle-mounted tweeter.

According to a second aspect of the present disclosure, an automobile audio system comprises a tweeter as described above.

In one embodiment, the automobile audio system further comprises a woofer.

In one embodiment, the automobile audio system is mainly composed of the tweeter and the woofer. That is, the automobile audio system does not include a mid-range loudspeaker.

In one embodiment, the panel of the tweeter is mounted on the interior of the automobile.

The present disclosure adopts the above solutions, and has the following advantages over the prior art:

in the tweeter of the present disclosure, by adding a cavity around the voice coil, the air-gap cavity of the tweeter is enlarged, so that the F0 (loudspeaker resonance frequency) of the tweeter is reduced, so that the intermediate frequency range of the tweeter extends further forward, thereby widening the starting frequency of the tweeter, and it can be better converged with the mid-bass loudspeaker in actual use; on this premise, no additional components are required, the size of the tweeter is relatively small and the assembly is relatively simple, especially the increase in the overall size (especially the thickness) of the loudspeaker is avoided, and the applicable scenarios are wider. By applying the automobile audio system of the present disclosure, a better sound playing effect can be obtained without providing a mid-range loudspeaker.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

REFERENCE NUMBERS

- 1—bracket; 11—inner flange; 12—outer flange; 13—groove; 14—damping material;
- 2—diaphragm; 21—top portion; 22—edge ring;
- 3—magnetic motor system; 31—front plate; 32—magnetic steel; 33—U-yoke; 331—main body; 332—upper flange;
- 4—voice coil; 41—through hole;
- 5—first cavity;
- 6—second cavity;
- 7—panel.

DETAILED DESCRIPTION

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure. Further, the technical features involved in the various embodiments of the present disclosure described below may be combined with each other if they do not conflict with each other.

As shown in this specification and claims, the terms “comprising” and “including” only indicate that the clearly identified steps and elements are included, and these steps and elements do not constitute an exclusive list, and the method or device may also include other steps or elements. The term “and/or” as used herein includes any combination of one or more of the associated listed items.

It should be noted that, unless otherwise specified, when a feature is called “arranged” or “connected” to another feature, it can be directly arranged or connected to another feature, or it can be indirectly arranged or connected to another feature. In addition, the descriptions of upper, lower, left, right, etc. used in the present disclosure are only relative to the position relation of each component of the present disclosure in the accompanying drawings.

This embodiment provides a tweeter, especially a vehicle-mounted tweeter, which is suitable for use in an automobile audio system. The overall size of the tweeter is more than 40 mm (specifically, the outer diameter of the component with the largest outer diameter, such as a bracket).

Figure 1:
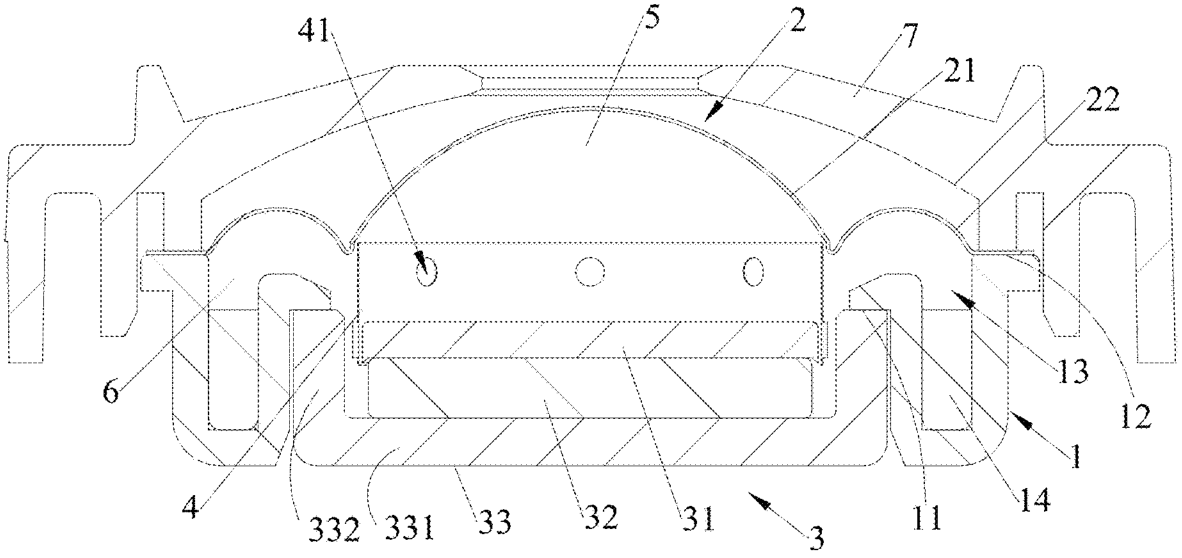
FIG. 1 is a sectional view of a tweeter of an embodiment of the present disclosure.

Referring to FIG. 1, a tweeter of this embodiment comprises a bracket 1, a diaphragm 2, a magnetic motor system 3 and a voice coil 4. The bracket 1 is used to support the diaphragm 2 and the magnetic motor system 3, and both the diaphragm 2 and the magnetic motor system 3 are arranged on the bracket 1. The diaphragm 2 comprises a top portion 21 and an edge ring 22 surrounding the top portion 21; the shape of the top portion 21 is specifically a part of the spherical shell in this embodiment, and its middle is arched upward, but it is not limited to this; the edge ring 22 extends radially outward from the edge of the top portion 21 so as to surround the top portion 21 in the circumferential direction. The diaphragm 2 is preferably integrally formed, that is, the top portion 21 and the edge ring 22 are integrated. The magnetic motor system 3 is located below the diaphragm 2 and has a magnetic gap into which the voice coil 4 is inserted. The upper end of the voice coil 4 is connected to the top portion 21 of the diaphragm 2 or the edge portion of the edge ring 22 close to the top portion 21, and the lower end portion thereof is inserted into the magnetic gap of the magnetic motor system 3, so as to be driven by the magnetic motor system 3 to vibrate to produce sound. The upper end of the voice coil 4 is preferably connected to the edge portion of the top portion 21 close to the edge ring 22. Therefore, as shown in FIG. 1, a first cavity 5 is formed between the top portion 21 of the diaphragm 2, the inner wall of the voice coil 4 and the magnetic motor system 3. The bracket 1 is hollow to accommodate the magnetic motor system 3, the bracket 1 has an annular (including but not limited to circular, square) inner flange 11 and an annular outer flange 12, the inner flange 11 is lower than the outer flange 12, the edge ring 22 of diaphragm 2 is fixed on the outer flange 12 of the bracket 1, and the magnetic motor system 3 is fixed on the inner flange 11 of the bracket 1, so as to form a second cavity 6 between the edge ring 22 of the diaphragm 2, the outer wall of the voice coil 4 and the bracket 1. One or more through holes 41 are opened on the voice coil 4, and the first cavity 5 is in communication with the second cavity 6 by means of the through hole(s) 41.

Further, the bracket 1 has a groove 13 formed between the outer flange 12 and the inner flange 11, and the groove 13 forms a part of the second cavity 6. The groove 13 is an annular groove 13 surrounding the magnetic motor system 3. The shape of the cross-section of the groove 13 includes, but is not limited to, a rectangle, a sector, and a triangle. Specifically in this embodiment, the bracket 1 is recessed downward from its portion that between the outer flange 12 and the inner flange 11 of the bracket 1 to form the groove 13, and the groove has an opening faces the fold ring 22 above. The bottom surface of the bracket 1 is higher than or in the same level with the bottom surface of the magnetic motor system 3.

Further, a damping material 14 is arranged in the groove 13. The damping material 14 is polyurethane foam or foamed rubber or felt.

Further, there is a plurality of through holes 41 which is arranged at intervals, preferably at equal intervals, along the circumferential direction of the voice coil 4. The shape of the through holes 41 includes, but is not limited to, a circle, a square, an ellipse, and a triangle. The above magnetic motor system 3 comprises a front plate 31, a magnetic steel 32 and a U-yoke 33 that are arranged in sequence. The U-yoke 33 comprises a main body 331 that is disc-shaped as a whole and an annular upper flange 332 extending upward from the main body 331, the upper flange 332 is fixedly connected to the inner flange 11 of the bracket 1, the front plate 31 and the magnetic steel 32 are arranged on the main body 331 of the U-yoke 33, and the upper flange 332 of the U-yoke 33 surrounds the front plate 31 and the magnetic steel 32 and forms the magnetic gap. The lower surface of the main body 331 of the U-yoke 33 is the bottom surface of the bracket 1, which is preferably in the same level with the bottom surface of the bracket 1. Although the inner magnetic motor system including U-yoke shown in FIG. 1 is used in this embodiment, in other embodiments, the inner magnetic motor system may be replaced with an outer magnetic motor system including T-yoke.

The tweeter further comprises a panel 6 covering above the diaphragm 2, and the panel 6, the edge ring 22 and the outer flange 12 of the bracket 1 are sequentially and fixedly connected.

Comparison of Loudspeaker Frequency Response Curves

Figure 2:
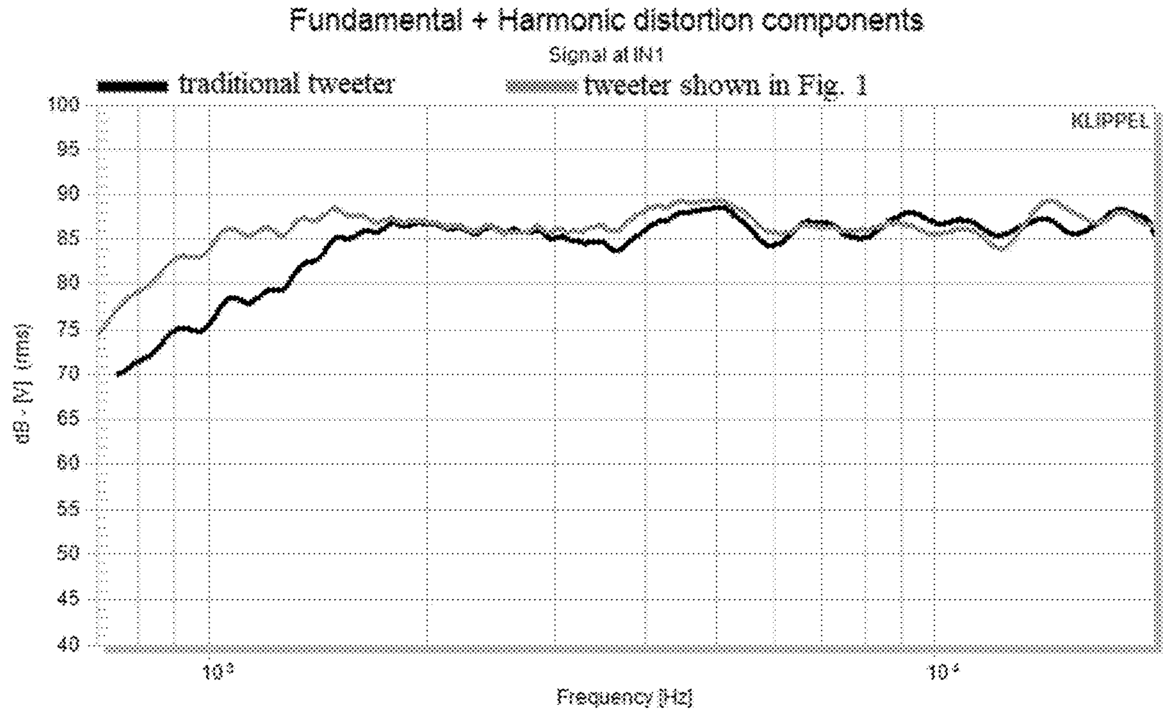
FIG. 2 is a comparison of the frequency response curves of the tweeter of an embodiment of the present disclosure and the traditional tweeter.

A frequency response test was performed on the traditional tweeter and the tweeter of this embodiment, and two frequency response curves of the tweeters were obtained, as shown in FIG. 2. Wherein, according to the color of the curves, the line with lighter color represents the frequency response curve of the tweeter of Embodiment 1, and the line with darker color represents the frequency response curve of the ordinary tweeter.

Comparison of Loudspeaker Impedance Curves

Figure 3:
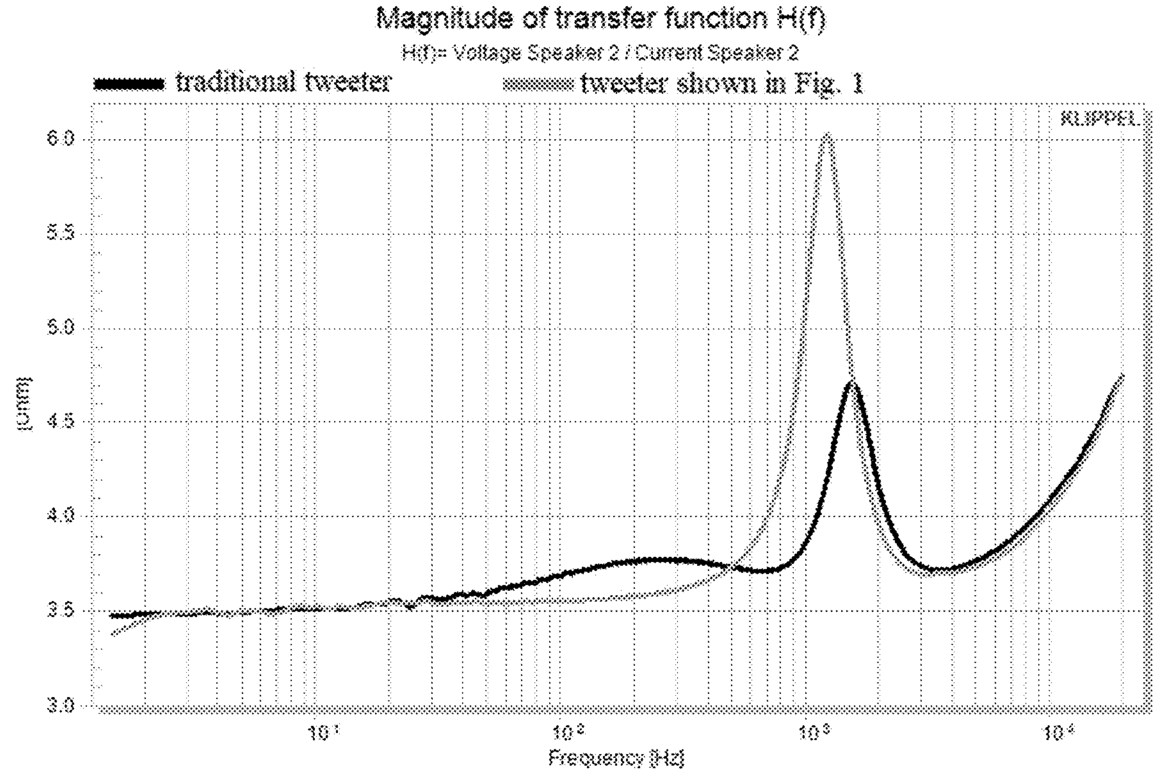
FIG. 3 is a comparison of the high-pitch impedance curves of the tweeter of an embodiment of the present disclosure and the traditional tweeter.

An impedance test was performed on the traditional tweeter and the tweeter of this embodiment, and the impedance curves of the tweeters were obtained, as shown in FIG. 3. Wherein, according to the color of the curves, the line with lighter color represents the frequency response curve of the tweeter of Embodiment 1, and the line with darker color represents the frequency response curve of the ordinary tweeter.

It can be seen from the Figs that the F0 (resonance frequency) of the tweeter of this embodiment is 1200 Hz, while the F0 (resonance frequency) of the traditional tweeter is 1580 Hz. The speaker extends more towards the low frequency part, the frequency response curve of the tweeter shown in FIG. 1 extends more to the low frequency range than the traditional tweeter.

In the above tweeter, by adding a cavity around the voice coil 4, the air-gap cavity of the tweeter is enlarged, so that the F0 (loudspeaker resonance frequency) of the tweeter is reduced, so that the intermediate frequency range of the tweeter extends further forward, thereby widening the starting frequency of the tweeter, and it can be better converged with the mid-bass loudspeaker in actual use; by adding the damping material 14 in the second cavity 6, the Q (Quality Factor) value of the tweeter is lowered to smooth the mid-frequency curve of the tweeter, reduce the distortion of the tweeter, and improve the sound quality. On this premise, no additional components are required, the size of the tweeter is relatively small and the assembly is relatively simple, especially the increase in the overall size (especially the thickness) of the loudspeaker is avoided, and the applicable scenarios are wider.

This embodiment further provides an automobile audio system. As shown in FIG. 4, the automobile audio system comprises a tweeter 100 and a woofer 200, which does not include a mid-range loudspeaker. The automobile audio system may further comprise a subwoofer. The tweeter 100 adopts the tweeter shown in FIG. 1, so it can be well matched with the woofer 200, and can be well converged in the mid-frequency range, and even without a mid-range loudspeaker, it can produce better sound effects.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A tweeter, comprising:

a bracket;

a diaphragm arranged on the bracket, and comprising a top portion and an edge ring around the top portion;

a magnetic motor system arranged on the bracket and having a magnetic gap, the magnetic motor system being located below the diaphragm; and a voice coil having an upper end connected to the top portion of the diaphragm or an edge portion of the edge ring close to the top portion, and a lower end portion inserted into the magnetic gap;

wherein, a first cavity is formed between the top portion of the diaphragm, an inner wall of the voice coil, and the magnetic motor system;

the bracket is hollow to accommodate the magnetic motor system, the bracket has an annular inner flange and an annular outer flange, the inner flange is lower than the outer flange, the edge ring of the diaphragm is connected to the outer flange of the bracket, and the magnetic motor system is connected to the inner flange of the bracket, so that a second cavity is formed between the edge ring of the diaphragm, an outer wall of the voice coil, and the bracket;

a through hole is opened on the voice coil, and the first cavity is in communication with the second cavity by the through hole; and the bracket has a groove formed between the outer flange and the inner flange, and the groove is a part of the second cavity, a damping material is arranged in the groove, and the damping material is polyurethane foam or foamed rubber or felt.

2. The tweeter according to claim 1, wherein the groove is an annular groove surrounding the magnetic motor system.

3. The tweeter according to claim 1, wherein a bottom surface of the bracket is higher than or in a same level with a bottom surface of the magnetic motor system.

4. The tweeter according to claim 1, wherein the upper end of the voice coil is connected to the edge portion of the top portion of the diaphragm close to the edge ring.

5. The tweeter according to claim 1, wherein the magnetic motor system comprises a front plate, a magnetic steel, and a U-yoke which are arranged in sequence, the U-yoke comprises a main body and an upper flange extending upward from the main body, and the upper flange is fixedly connected to the inner flange of the bracket, the front plate and the magnetic steel are arranged on the main body of the U-yoke, and the upper flange of the U-yoke surrounds the front plate and the magnetic steel to form the magnetic gap.

6. The tweeter according to claim 1, wherein the magnetic motor system comprises a front plate, a magnetic steel, and a T-yoke, the T-yoke comprises a main body and a columnar portion extending upward from the main body, the magnetic steel and the front plate are stacked on the main body from bottom to top, the magnetic steel and the front plate are sleeved on the columnar portion, the magnetic gap is formed between an outer surface of the columnar portion and inner surfaces of the front plate and the magnetic steel, and the main body is fixedly connected to the bracket.

7. The tweeter according to claim 1, wherein a plurality of through holes are arranged at intervals along a circumferential direction of the voice coil.

8. The tweeter according to claim 1, further comprises a panel covering above the diaphragm, and the panel, the edge ring and the outer flange of the bracket are sequentially and fixedly connected.

9. The tweeter according to claim 1, wherein the tweeter is a vehicle-mounted tweeter.

10. An automobile audio system, comprising the tweeter according to claim 1.

11. The automobile audio system according to claim 10, wherein the automobile audio system further comprises a woofer.

12. The automobile audio system according to claim 11, wherein the automobile audio system is mainly composed of the tweeter and the woofer.

13. The tweeter according to claim 1, wherein the groove is located below the edge ring, and the groove has an opening faces the edge ring above.

* * * * *